E. COX.
Churn Top.
No. 53,952. Patented April 17, 1866.
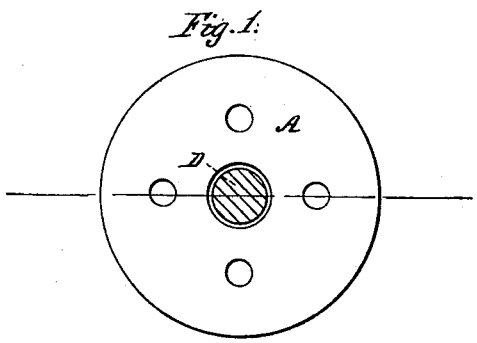
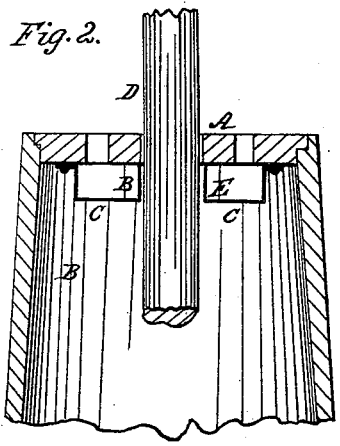
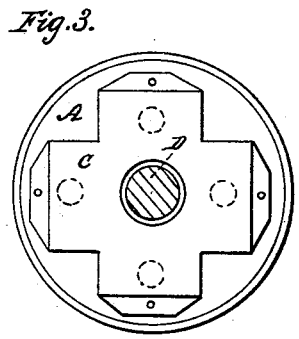
Witnesses:
Inventor:

UNITED STATES PATENT OFFICE.

E. COX, OF POINT PLEASANT, OHIO.

IMPROVEMENT IN CHURN-TOPS.

Specification forming part of Letters Patent No. 53,952, dated April 17, 1866.

*To all whom it may concern:*

Be it known that I, E. Cox, of Point Pleasant, in the county of Clermont and State of Ohio, have invented a new and useful Improvement in Churn-Tops; and I do hereby declare that the following is a full, clear, and exact description thereof, which will enable others skilled in the art to make and use the same, reference being had to the accompanying drawings, forming part of this specification, in which—

Figure 1 is a top view of my improved churn-top. Fig. 2 is a vertical section through the line *x x*, Fig. 1, and showing in red lines the relative position of the churn and dasher-handle. Fig. 3 is a bottom view of my improved churn-top.

Similar letters of reference indicate like parts.

My invention has for its object the prevention of the cream or milk, in a vertical churn, from splashing or spattering out during the operation of churning; and it consists in combining with a churn-top a plate formed and applied as hereinafter more fully described.

A is the top of a vertical churn, B, whether said churn is operated by hand or by power. The said top A is made and attached to the churn in the ordinary manner.

To the lower part of the lid or top A is attached a plate, C, made in the form of a square cross, the ends of the arms of which are bent over at right angles and nailed or screwed fast to the said lower part of said lid or top, as shown in Figs. 2 and 3.

To the edge of the hole in the center of the plate C, through which the handle D of the dasher passes, is attached the lower end of a short tube, E, the upper end of which should reach to about the lower surface of the cover or top A of the churn. The handle D of the dasher thus works in a tube, which prevents the cream or milk from spattering or splashing out around the said handle D.

The ventilating-holes through the top A are placed directly over the arms of the plate C, and the proper amount of ventilation is secured by making these holes no larger than the arms of the plate they will cover.

By this arrangement the cream or milk, however violently they may be agitated, will be unable to find their way out through the top of the churn, and all splashing and spattering will be prevented. At the same time the air is allowed to have free access to the churn, and by its contact with the cream or milk while being agitated the formation of the butter is facilitated.

I claim as new and desire to secure by Letters Patent—

1. A churn-top formed by combining the plate C, constructed as described, with the top or cover A, substantially as and for the purpose set forth.

2. The combination of the tube E with the plate C and top A, substantially as described, and for the purpose set forth.

EDWARD COX.

Witnesses:
 ISAAC MITCHELL,
 W. H. SUNTLAND.